(12) United States Patent
Pike et al.

(10) Patent No.: US 10,884,589 B2
(45) Date of Patent: Jan. 5, 2021

(54) DETERMINING USER PREFERENCE OF AN OBJECT FROM A GROUP OF OBJECTS MAINTAINED BY A SOCIAL NETWORKING SYSTEM

(75) Inventors: Mark Pike, San Francisco, CA (US); Yuankai Ge, Palo Alto, CA (US); Chad Little, San Carlos, CA (US)

(73) Assignee: Facebook, Inc., Menlo Park, CA (US)

( * ) Notice: Subject to any disclaimer, the term of this patent is extended or adjusted under 35 U.S.C. 154(b) by 547 days.

(21) Appl. No.: 13/602,685

(22) Filed: Sep. 4, 2012

(65) Prior Publication Data

US 2014/0067546 A1 Mar. 6, 2014

(51) Int. Cl.
*G06Q 30/00* (2012.01)
*G06F 3/0484* (2013.01)
*G06Q 30/02* (2012.01)
*G06Q 50/00* (2012.01)

(52) U.S. Cl.
CPC ..... *G06F 3/04842* (2013.01); *G06Q 30/0269* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 8,539,359 B2 * | 9/2013 | Rapaport | G06Q 30/02 715/751 |
| 8,700,705 B2 * | 4/2014 | Danezis et al. | 709/204 |
| RE44,968 E * | 6/2014 | Flinn | 706/12 |
| 2009/0299824 A1 * | 12/2009 | Barnes, Jr. | 705/10 |
| 2011/0022602 A1 * | 1/2011 | Luo et al. | 707/748 |
| 2011/0066613 A1 * | 3/2011 | Berkman et al. | 707/734 |
| 2011/0093340 A1 * | 4/2011 | Kramer et al. | 705/14.58 |
| 2011/0119130 A1 * | 5/2011 | Agan et al. | 705/14.49 |
| 2012/0110071 A1 * | 5/2012 | Zhou et al. | 709/204 |
| 2012/0166532 A1 * | 6/2012 | Juan | G06Q 50/01 709/204 |
| 2012/0290950 A1 * | 11/2012 | Rapaport | H04N 21/8358 715/753 |

* cited by examiner

*Primary Examiner* — Waseem Ashraf
*Assistant Examiner* — Michael I Ezewoko
(74) *Attorney, Agent, or Firm* — Fenwick & West LLP

(57) ABSTRACT

A social networking system identifies a user's relative preference for objects maintained by the social networking system, such as pages associated with movies, restaurants, businesses, or other content. To obtain the user's preferences, the system provides pairs, or groups, of objects to a user and prompts the user to indicate a preference between the objects in each pair. This obtained information about the user's relative preferences is stored in conjunction with the user's profile, which can then be used to select content subsequently presented to the user.

19 Claims, 3 Drawing Sheets

DETERMINING USER PREFERENCE OF AN OBJECT FROM A GROUP OF OBJECTS MAINTAINED BY A SOCIAL NETWORKING SYSTEM

BACKGROUND

Embodiments of the present disclosure relate generally to social networking and, more specifically, to determining user preference for objects in a social networking system.

Social networks, or social utilities that track and enable connections between users (including people, businesses, and other entities), have become prevalent in recent years. In particular, a social networking system allows users to more efficiently communicate information that is relevant to their friends or other connections in the social network. Social networks typically incorporate a system for maintaining connections among users in the social network and links to content that are likely to be relevant to the users. Social networks also collect and maintain information about the users of the social network. This information may be static, such as geographic location, employer, job type, age, music preferences, interests, and a variety of other attributes, or it may be dynamic, such as tracking a user's actions within the social network. This information can then be used to target information delivery so that information more likely to be of particular interest to a user can be communicated to that user.

While social networking systems allow a user to identify products or services that the user likes or prefers, these indications of preference merely allow a user to express a generalized preference for a product or service. For example, a user may identify a preference for multiple restaurants, but is currently unable to indicate how the user prefers the restaurants relative to each other. This limits the accuracy of the information about the user maintained by the social networking system.

SUMMARY

A social networking system identifies a user's relative preference for objects maintained by the social networking system, such as pages associated with movies, restaurants, businesses, or other content. To obtain the user's preferences, the system provides pairs, or groups, of objects to a user and prompts the user to indicate a preference between the objects in each pair. This obtained information about the user's relative preferences is stored in conjunction with the user's profile, which can then be used to select content to be presented to the user.

In one embodiment, the social networking system selects a pair of objects from objects maintained by the social networking system. The pair of objects may be selected based on associations between objects previously stored in the social networking system or may be dynamically selected based in part on information in a user profile associated with a viewing user. In one embodiment, actions performed by the viewing user, characteristics specified in the user profile or characteristics in user profiles associated with other users connected to the viewing user may be used to select the pair of objects. For example, a pair of objects associated with the viewing user's current location or a pair of objects associated with interests specified by user profiles associated with users connected to the viewing user are selected.

The pair of objects is presented to the viewing user, who then provides the social networking system with a selection of an object from the pair of objects. For example, the selection identifies the object from the pair of objects that the viewing user prefers. Based on the viewing user's selection, the social networking system associates relative preference information with the viewing user. The relative preference information identifies the object selected by the viewing user from the pair of objects. In one embodiment, the social networking system creates a page associated with the pair of objects and stores a connection between the viewing user and the page that identifies the selected object.

Based on the relative preference information associated with the viewing user, the social networking system modifies the user profile associated with the viewing user or selects content to present to the viewing user. For example, the viewing user's user profile is modified to include an interest or other attribute associated with object selected from the pair of objects. As another example, the viewing user's selection of an object from a pair of objects increases the likelihood that the viewing user receives an advertisement associated with the selected object. Additionally, the viewing user's selection of an object from the pair may be used to modify the affinities of the viewing user for the objects in the pair, allowing the relative preference to influence subsequent content sent to the viewing user.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
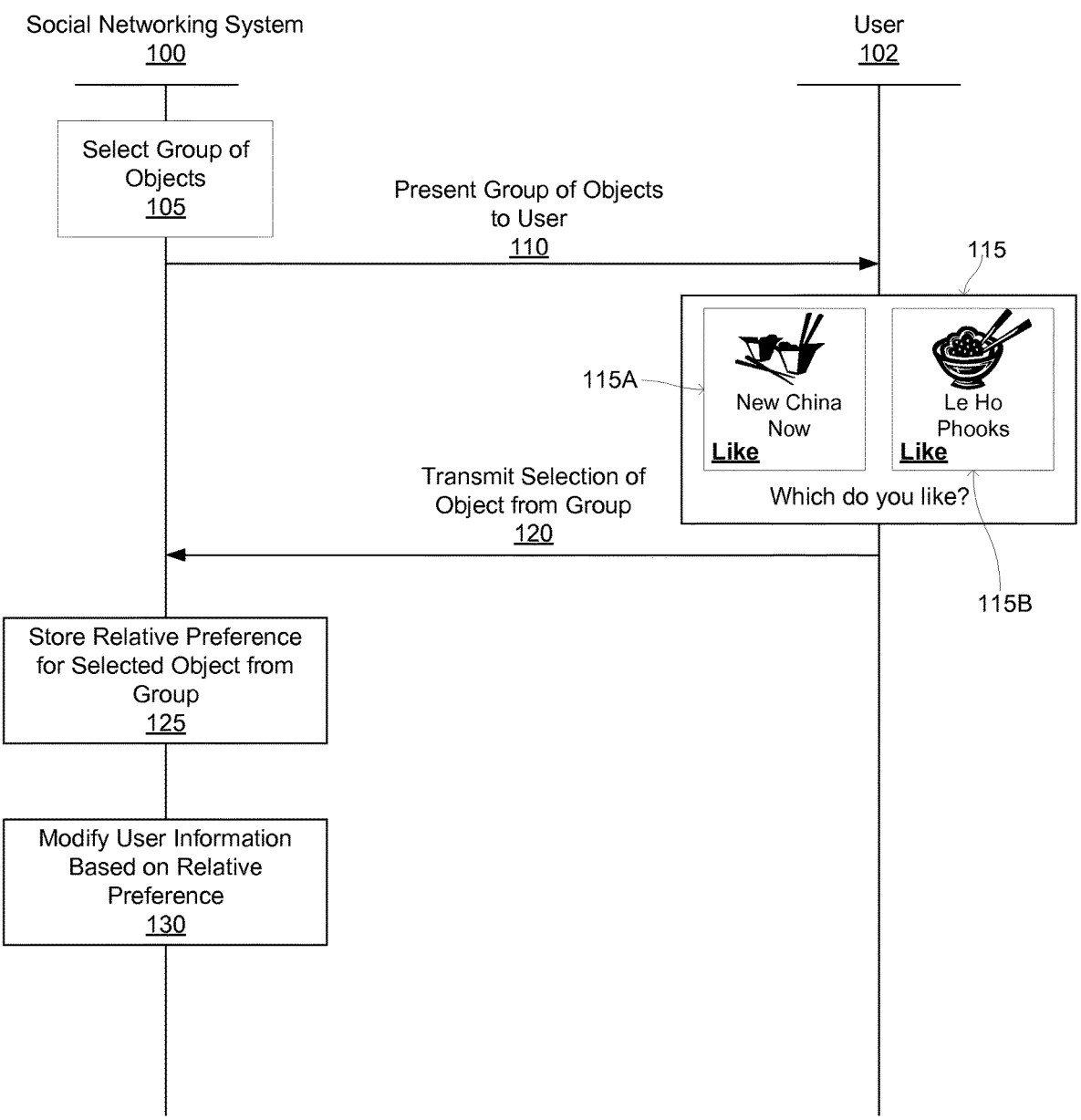
FIG. 1 is an example of determining user preference for objects maintained by a social networking system, in accordance with an embodiment of the invention.

FIG. 1 shows an example of determining user preference for an object maintained by a social networking system 100 relative to other objects maintained by the social networking system 100. Typically, users of a social networking system 100 may express a preference for an object maintained by the social networking system 100; however, this expression of preference does not indicate whether the user likes the object more or less than other objects maintained by the social networking system 100. For example, a user may indicate a preference for a variety of restaurants associated with pages or other objects in the social networking system 100. Although this information allows the social networking system 100 to identify restaurants that the user likes, it does not provide insight about the user's preference for a restaurant the user likes relative to other restaurants that the user likes. Hence, while a user may indicate a preference for pages in the social networking system 100 associated with two different pizza parlors, information describing the user's preference for one of the pizza parlors relative to the other is not captured by conventional social networking systems.

To obtain information about a user's relative preference for objects, the social networking system 100 selects 105 a group of objects and presents 110 the group of objects to the user 102. In one embodiment, the social networking system 100 selects 105 a pair of objects and presents 110 the pair of objects to the user 102. For example, a pair of pages maintained by the social networking system 100 are selected 105 and presented 110 to the user 102.

A group or pair of objects may be dynamically generated or may be retrieved from stored information. For example, pairings of objects are identified by associations between the objects stored in the social networking system 100. An association may be retrieved to select 105 a group of objects. Alternatively, an object may be identified based on the user's user profile and the social networking system 100 determines if the identified object is included in one or more associations and selects an association.

The social networking system 100 may alternatively dynamically generate a group of objects based on characteristics of an object. For example, a topic associated with an object is determined and an additional object associated with the same topic is selected to form a pair of objects. As another example, after determining the topic associated with an object, an additional object associated with a different topic is selected to generate a pair of objects for selection.

One or more conditions may cause selection of the group of objects. In one embodiment, a group of objects is selected 105 in response to the social networking system 100 receiving a check-in to a location from the user 102. The group of objects selected 105 are then selected based on one or more properties of the location to which the user checks-in. For example, if the user 102 checks-in to a restaurant, a pair of objects is selected 105 that include an object associated with the restaurant to which the user checked-in and an object associated with a restaurant to which the user previously checked-in. As another example, a page associated with the restaurant to which the user checked-in and a page associated with another restaurant within a specified distance of the restaurant to which the user checked-in are selected 105. Similarly, if the user 102 checks-in is a stadium, the social networking system 100 selects 105 a pair of objects related to a sport associated with the stadium.

A group or pair of objects may also be selected 105 based on actions performed by the user and recorded by the social networking system 100. For example, if the user 102 is listening to music using an application communicating with the social networking system 100, a pair of objects associated with different genres of music may be selected 105 or a pair of objects associated with artist within a genre of music to which the user is listening may be selected 105. A group or pair of objects may also be selected 105 in response to a user accessing the social networking system 100 or performing any other suitable action captured by the social networking system 100.

Any suitable information included in a user profile associated with the user 102 may be used to select 105 the group or pair of objects. In one embodiment, additional users connected to the user 102 are identified from the user profile and interests in user profiles of the additional users are used to select 105 a group of objects. For example, a pair of objects associated with two interests that appear most frequently in the user profiles of the additional users are selected 105. As another example, a pair of objects associated with an interest appearing in the most user profiles associated with users connected to the user 102 is selected 105.

The selected group of objects is presented 110 to the user 102 via a client device along with a prompt for the user 102 to select an object from the group. In the example of FIG. 1, a selection interface 115 including data associated with a pair of objects is presented 110 to the user 102. The example selection interface 115 of FIG. 1 displays information 115A, 115B associated with each of the selected objects along with a prompt for selecting an object. For example, the selection interface 115 includes an image and name associated with the objects in the pair or group. While the prompt in FIG. 1 asks the user 102 to select an object the user likes, the prompt may identify different criteria for selecting an object from the group or pair.

The user's selection of an object from the group or pair is transmitted 120 to the social networking system 100, which stores 125 data describing the user's relative preference for the objects in the selected group. In one embodiment, the social networking system 100 stores 125 data identifying the user 102, the objects included in the selected group and the object from the group selected by the user 102. For example, the social networking system 100 stores a page or other object associated with the group of objects and associates a user profile for the user the user 102 and object selected from the group with page or other object associated with the group of objects. Alternatively, relative preference information is stored 125 as an identifier of the user 102, an identifier of each object in the group and the identifier of the object selected by the user. In one embodiment, the relative preference information may include additional data describing the selection, such as whether the object selected by the user 102 was the object liked by the user or was the object disliked by the user 102. The relative preference information is also associated with the user's user profile, allowing the social networking system 100 to augment the user profile with additional information and to account for the user's relative preferences when selecting content.

Based at least in part on the relative preference information, the social networking system 100 modifies 130 information associated with the user 102. For example, an advertisement associated with the object from the group of objects selected by the user 102, or associated with an entity associated with the selected object, is presented to the user 102. As another example, the relative preference information modifies ranking of advertisements for presentation to the user 102; for example, the relative preference of the user 102 for the selected object causes advertisements associated with selected the object to be selected for presentation even if an advertisement associated with the non-selected object has a higher bid price than the advertisement associated with the selected object. Additionally, the relative preference information may modify the user's affinity for the objects in the group; for example, the user's affinity for the selected object is increased because of the user's selection. This modification of affinity may be used to modify how objects are selected for presentation to the user 102, so the selection reflects the user's relative preferences for various objects.

In other embodiments, the social networking system may make suggestions to users about the objects based on the relative preference information of the user and/or the user's friends. For example, the social networking system may use a user's relative preference information to suggest restaurants to the user for making dinner reservations. The social networking system may also use a user's relative preference information to make product recommendations to the user or gift suggestions for the user to the user's friends. A variety of other recommendations may be made using the information contained about a user's relative preferences.

System Architecture

Figure 2:
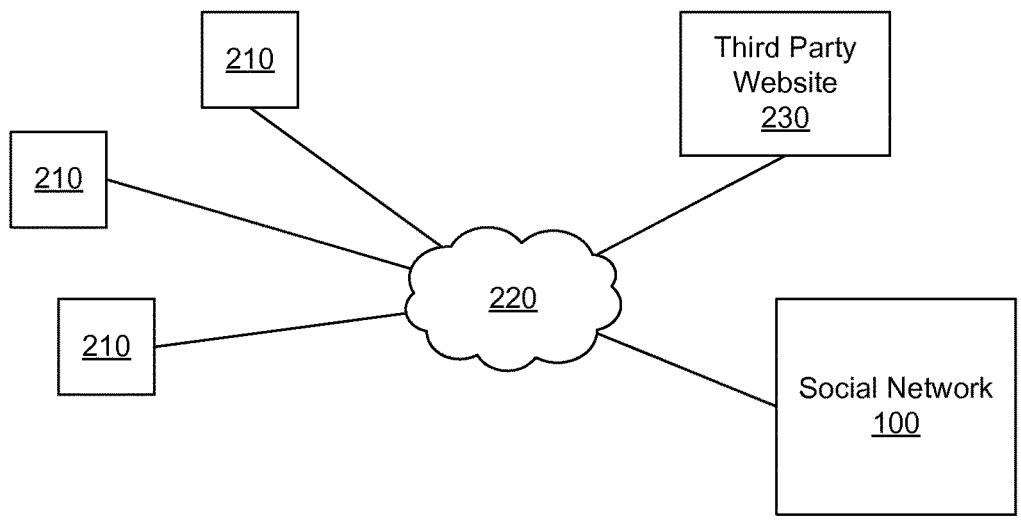
FIG. 2 is a block diagram of a system environment in which a social networking system operates, in accordance with an embodiment of the invention.

FIG. 2 is a high level block diagram illustrating a system environment 200 for a social networking system 100. The system environment 200 comprises one or more client devices 210, a network 220, one or more third-party websites 230 and the social networking system 100. In alternative configurations, different and/or additional components may be included in the system environment 200. The embodiments described herein can be adapted to online systems that are not social networking systems.

The client devices 210 comprise one or more computing devices capable of receiving user input as well as transmitting and/or receiving data via the network 220. In one embodiment, a client device 210 is a conventional computer system, such as a desktop or laptop computer. In another embodiment, a client device 210 may be a device having computer functionality, such as a personal digital assistant (PDA), mobile telephone, smart-phone or similar device. A client device 210 is configured to communicate via the network 220. In one embodiment, a client device 210 executes an application allowing a user of the client device 210 to interact with the social networking system 100. For example, a client device 210 executes a browser application to enable interaction between the client device 210 and the social networking system 100 via the network 220. In another embodiment, a client device 210 interacts with the social networking system 100 through an application programming interface (API) that runs on the native operating system of the client device 210, such as IOS® or ANDROID™.

The client devices 210 are configured to communicate via the network 220, which may comprise any combination of local area and/or wide area networks, using both wired and wireless communication systems. In one embodiment, the network 220 uses standard communications technologies and/or protocols. Thus, the network 220 may include links using technologies such as Ethernet, 802.11, worldwide interoperability for microwave access (WiMAX), 3G, 4G, CDMA, digital subscriber line (DSL), etc. Similarly, the networking protocols used on the network 220 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 220 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec). The third party website 230 may be coupled to the network 220 for communicating with the social networking system 100, which is further described below in conjunction with FIG. 3.

Figure 3:
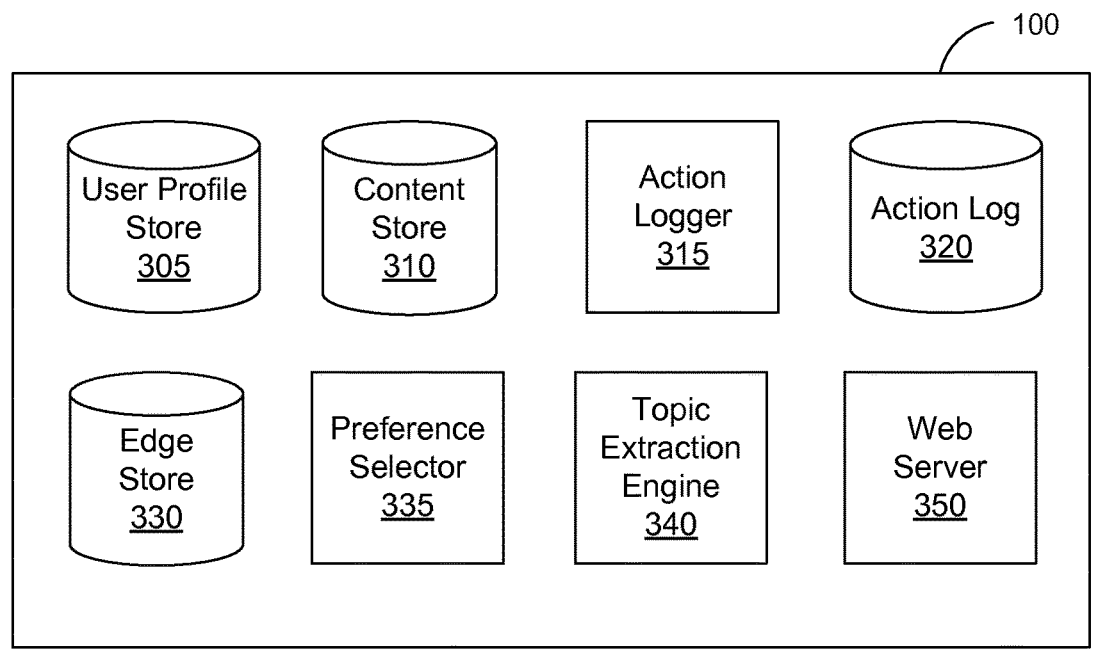
FIG. 3 is a block diagram of a social networking system, in accordance with an embodiment of the invention.

FIG. 3 is an example block diagram of an architecture of the social networking system 100. The social networking system 100 includes a user profile store 305, a content store 310, an action logger 315, an action log 320, an edge store 330, a preference selector 335, and a web server 350. In other embodiments, the social networking system 100 may include additional, fewer, or different components for various applications. Conventional components such as network interfaces, security functions, load balancers, failover servers, management and network operations consoles, and the like are not shown so as to not obscure the details of the system architecture.

Each user of the social networking system 100 is associated with a user profile, which is stored in the user profile store 305. A user profile includes declarative information about the user that was explicitly shared by the user, and may also include profile information inferred by the social networking system 100. In one embodiment, a user profile includes multiple data fields, each data field describing one or more attributes of the corresponding user of the social networking system 100. The user profile information stored in user profile store 305 describes the users of the social networking system 100, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 100 displayed in an image. A user profile in the user profile store 305 may also maintain references to actions by the corresponding user performed on content items in the content store 310 and stored in the action log 320.

While user profiles in the user profile store 305 are frequently associated with individuals, allowing people to interact with each other via the social networking system 100, user profiles may also be stored for entities such as businesses or organizations. This allows an entity to establish a presence on the social networking system 100 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 310 stores objects representing various types of content. Examples of content represented by an object include a page post, a status update, a photo, a video, a link, a shared content item, a gaming application achievement, a check-in event at a local business, a brand page, or any other type of content. Objects may be created by users of the social networking system 100, such as status updates, photos tagged by users to be associated with other objects in the social networking system, events, groups or applications. In some embodiments, objects are received from third-party applications or third-party applications separate from the social networking system 100. Content "items" represent single pieces of content that are represented as objects in the social networking system 100. Users of the social networking system 100 are encouraged to communicate with each other by posting text and content items of various types of media through various communication channels, increasing the interaction of users with each other and increasing the frequency with which users interact within the social networking system.

The action logger 315 receives communications about user actions on and/or off the social networking system 100, populating the action log 320 with information about user actions. Such actions may include, for example, adding a connection to another user, sending a message to another user, uploading an image, reading a message from another user, viewing content associated with another user, attending an event posted by another user, among others. In some embodiments, the action logger 315 identifies interaction between a social networking system user and a brand page within the social networking system 100, which communicates targeting criteria associated with content on the brand page to the content selector 170 to customize content from the brand page. In addition, a number of actions described in connection with other objects are directed at particular users, so these actions are associated with those users as well. These actions are stored in the action log 320.

The action log 320 may be used by the social networking system 100 to track user actions on the social networking system 100, as well as external website that communicate information to the social networking system 100. Users may interact with various objects on the social networking system 100, including commenting on posts, sharing links, and checking-in to physical locations via a mobile device, accessing content items or other interactions. Information describing these actions is stored in the action log 320. Additional examples of interactions with objects on the social networking system 100 included in the action log 320 include commenting on a photo album, communications between users, becoming a fan of a musician, adding an event to a calendar, joining a groups, becoming a fan of a brand page, creating an event, authorizing an application, using an application and engaging in a transaction. Additionally, the action log 320 records a user's interactions with advertisements on the social networking system 100 as well as other applications operating on the social networking system 100. In some embodiments, data from the action log 320 is used to infer interests or preferences of the user, augmenting the interests included in the user profile and allowing a more complete understanding of user preferences.

The action log 320 may also store user actions taken on external websites. For example, an e-commerce website that primarily sells sporting equipment at bargain prices may recognize a user of a social networking system 100 through social plug-ins that enable the e-commerce website to identify the user of the social networking system 100. Because users of the social networking system 100 are uniquely identifiable, e-commerce websites, such as this sporting equipment retailer, may use the information about these users as they visit their websites. The action log 320 records data about these users, including webpage viewing histories, advertisements that were engaged, purchases made, and other patterns from shopping and buying.

In one embodiment, an edge store 330 stores the information describing connections between users and other objects on the social networking system 100 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system.

The edge store 330 stores edge objects that include information about the edge, such as affinity scores for objects, interests, and other users. Affinity scores may be computed by the social networking system 100 over time to approximate a user's affinity for an object, interest, and other users in the social networking system 100 based on the actions performed by the user. A user's affinity may be computed by the social networking system 100 over time to approximate a user's affinity for an object, interest, and other users in the social networking system 100 based on the actions performed by the user. Computation of affinity is further described in U.S. patent application Ser. No. 12/978,265, filed on Dec. 23, 2010, which is hereby incorporated by reference in its entirety. Multiple interactions between a user and a specific object may be stored in one edge object in the edge store 330, in one embodiment. In some embodiments, connections between users may be stored in the user profile store 310, or the user profile store 310 may access the edge store 330 to determine connections between users.

The preference selector 335 presents groups of objects retrieved from the content store 310 to a viewing user. Along with a group of objects, the preference selector 335 prompts the viewing user to select an object from the group of objects. For example, a prompt requesting the viewing user to pick its favorite or preferred object from the group of objects is presented. As another example, a prompt requesting the viewing user pick its least favorite object from the group of objects is presented. When the viewing user communicates a selection of an object to the social networking system 100, the preference selector generates relative preference data identifying the viewing user, each of the group of objects presented to the viewing user and the object selected by the viewing user. The relative preference data may also indicate the type of user preference being stored. For example, the relative preference data identifies whether the selected object is the most preferred or least preferred object from the group of objects. In one embodiment, the relative preference data includes various fields including a user identifier associated with the viewing user, object identifiers associated with each object in the group of objects, an object identifier associated with the selected object and a description of the type of selection. The relative preference data is stored in the content store 310 or in the user profile 305 and associated with the viewing user's user profile. The preference selector 335 is further described below in conjunction with FIG. 4.

In various embodiments, the preference selector 335 uses the relative preference information for a viewing user to modify information about the viewing user or to select content subsequently presented to the viewing user. For example, the preference selector 335 uses the viewing user's relative preference information to increase the likelihood that the viewing user receives advertisements associated with the object that the viewing user selected from the group of objects. In one embodiment, the preference selector 335 uses the viewing user's relative preference information along with advertisement bid prices to allow selection of an advertisement associated with the selected object over an advertisement associated with the object that was not selected, even if the advertisement associated with the selected object has a lower bid price. The relative preference information may also modify the viewing user's affinity for the objects included in the group, so that the viewing user's affinity for the object selected from the group is increased. This affinity modification allows content subsequently presented to the viewing user to account for the viewing user's relative preferences for various objects.

In one embodiment, the social networking system 100 includes a topic extraction engine 340, which identifies one or more topics associated with objects in the content store 310. To identify topics associated with content items, the topic extraction engine 340 may identify anchor terms described in the content items (e.g., in posts of the user) associated with the action and determines the meaning of the terms as further described in U.S. application Ser. No. 13/167,701, filed Jun. 24, 2011, which is hereby incorporated by reference in its entirety. For example, the topic extraction engine 340 determines one or more topics associated with a page maintained in the content store 310. The one or more topics associated with an object are stored and associated with an object identifier corresponding to the object. In various embodiments, associations between object identifiers and topics are stored in the topic extraction engine 340 or in the content store 310. This allows retrieval of one or more topics associated with an object identifier or retrieval of object identifiers associated with a specified topic.

The web server 350 links the social networking system 100 via the network 220 to the one or more client devices 210, as well as to the one or more third party websites 230. The web server 350 serves web pages, as well as other web-related content, such as Java, Flash, XML and so forth. The web server 350 may provide the functionality of receiving and routing messages between the social networking system 100 and the client device 210, for example, instant messages, queued messages (e.g., email), text and SMS (short message service) messages, or messages sent using any other suitable messaging technique. A user may send a request to the web server 350 to upload information, for example, images or videos that are stored in the content store 310. Additionally, the web server 350 may provide API functionality to send data directly to native client device operating systems, such as IOS®, ANDROID™, WEBOS® or RIM.

Determining User Relative Preference for Social Networking System Objects

Figure 4:
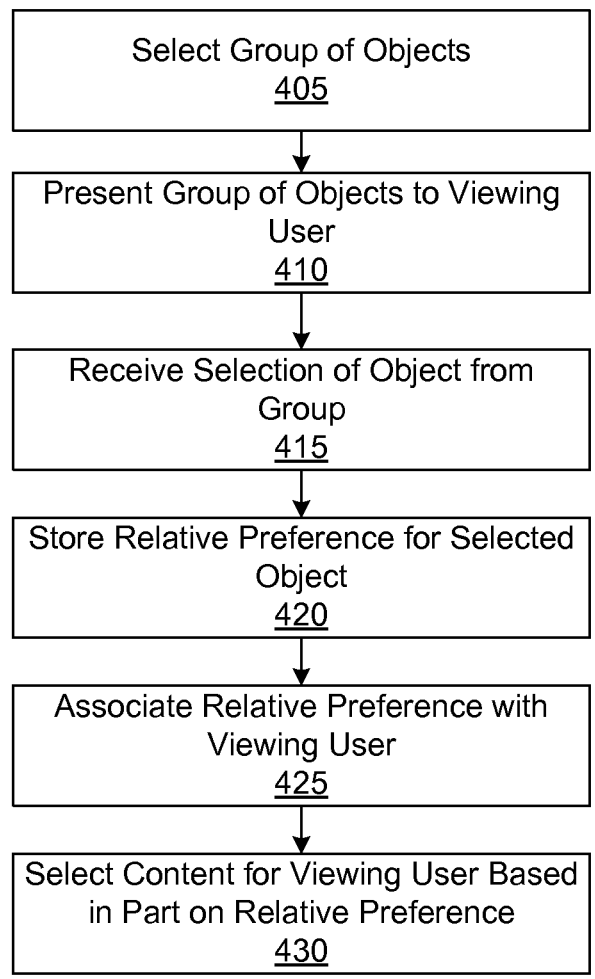
FIG. 4 shows a flow chart of one embodiment of a method for determining user relative preference of an object from a group of objects, in accordance with an embodiment of the invention.

FIG. 4 shows a flow chart of one embodiment of a method 400 for determining user relative preference of an object from a group of objects in a social networking system 100. In one embodiment, the preference selector 335 selects 405 a group of objects from the content store 310 of the social networking system 100. For example, the preference selector 335 selects 405 a pair of objects from the content store 310. In one embodiment, the group of objects is selected 405 based on groupings or pairings of objects are identified by one or more users and stored in the content store 310. For example, a user associates a pair of objects and stores an association between identifiers associated with each of the objects, and the preference selector 335 selects 405 the pair of objects by retrieving the stored association.

Alternatively, the group of objects may be dynamically selected 405 based on one or more conditions. In one embodiment, a pair of objects is identified based on an action performed by the viewing user or based on information in a user profile associated with the viewing user. For example, a group of objects is selected 105 based on one or more properties of a location to which the viewing user checked-in via the social networking system 100. If the viewing user checks-in to a restaurant, a pair of objects is selected 405 including an object associated with the restaurant to which the viewing user checked-in and includes an object associated with a restaurant to which the user previously checked-in. As another example, the preference selector 335 selects 405 and object associated with the restaurant to which the user checked-in and an object associated with another restaurant within a specified distance of the restaurant to which the user checked-in as the group. In an additional example, if the user checks-into a location that is a stadium, the preference selector 335 selects 405 a group of objects related to a sport associated with the stadium.

Other types of actions recorded by the action logger may cause selection of a group or pair of objects. For example, if the viewing user listens to music using an application communicating with the social networking system 100, the preference selector 335 may select 405 a pair or group of objects associated with different genres of music or may select 405 a pair of objects associated with artists within a genre of music to which the viewing user is listening 105 may be selected. The preference selector 335 may select 405 a group or pair of users responsive to the viewing user performing any other suitable action captured by the action logger 315.

In addition to actions performed by the viewing user, any suitable information included in a user profile associated with the viewing user may be used to select 405 the group or pair of objects. For example, additional users connected to the viewing user are identified from the user profile store 305 and/or from the edge store 330 and interests in user profiles of the additional users are used to select 405 a group of objects. For example, objects associated with each of two interests appearing most frequently in user profiles of the additional users are selected 405. As another example, a pair of objects associated with an interest appearing in the greatest number of user profiles associated with users connected to the viewing user is selected 405.

The selected group of objects is presented 410 to the user via a client device 210 associated with the viewing user along with a prompt for the viewing user to select an object from the group. In one embodiment, identifying information associated with each object in a group is displayed to the viewing user along with a prompt for selecting an object. For example, an image and/or a name associated with each objects in the pair or group is presented 410 to the viewing user along with a description of criteria upon which the viewing user bases a selection. For example, a prompt requests the viewing user to select an object from the group that the user prefers or likes, indicating the user's preference for an object relative to another object, or objects, in the group.

The viewing user's selection of an object from the group or pair is received 415 by the preference selector 335 and relative preference information for the selected object is stored 420 in one or more of the content store 310, the user profile store 305 and the edge store 330. The stored relative preference information is also associated 425 with the viewing user's user profile; for example, the relative preference information may be included in the viewing user's user profile. In one embodiment, the relative preference information includes data identifying the viewing user, data identifying the objects included in the selected group and data identifying the object from the group selected by the viewing user. The relative preference data may include additional data describing the selection, such as whether the object selected by the viewing user was the object liked or disliked by the viewing user. Alternatively, a page or other object associated with the group of objects is stored in the content store 310 and a connection between the viewing user's user profile and the object associated with the group of objects is stored in the edge store 330; the edge may identify the object from the group of objects that the viewing user selected.

Based at least in part on the relative preference information associated with the viewing user, the social networking system 100 selects 430 additional content for the viewing user. For example, the preference selector 335 uses the viewing user's relative preference information to increase the likelihood that the viewing user receives advertisements associated with the object that the viewing user selected from the group of objects. In one embodiment, the preference selector 335 uses the viewing user's relative preference information along with advertisement bid prices to allow selection of an advertisement associated with the selected object over an advertisement associated with the object that was not selected, even if the advertisement associated with the selected object has a lower bid price. The relative preference information may also modify the viewing user's affinity for the objects included in the group, so that the viewing user's affinity for the object selected from the group is increased. This modification allows content subsequently presented to the viewing user to account for the viewing user's relative preferences for various objects.

Additionally, the relative preference information may be used to create a ranking of objects for presentation to the viewing user or to other users connected to the viewing user. In one embodiment, different pairs of objects within a set of objects are presented to the viewing user and the objects selected from the different pairs are used to rank the objects within the set based on the viewing user's relative preferences. The ranked set may subsequently be presented to the viewing user or to other users connected to the viewing user. For example, various pairs of restaurants within a specified location of the viewing user's location, various pairs of restaurants to which the viewing user checked-in, or various pairs of restaurants for which the viewing user expressed a preference are presented to the viewing user. Based on the viewing user's selection of restaurants from the various pairs, the viewing user's ranking of the restaurants is determined. This viewing user-specific restaurant ranking may be shared with other users connected to the viewing user or included in advertisements associated with the restaurant that are presented to users connected to the viewing user. In one embodiment, the ranking may be used to suggest a restaurant to the user.

In one embodiment, the user may curate the ranking of a set of objects that the social networking system has determined for the user. For example, the social networking system may generate a ranking of more than two objects by combining the user's relative preference information for various pairs of objects. The system may present the ranked objects to the user, either all of the objects ro a set of them (e.g., a top ten listing of restaurants). The system may then provide user interface controls that allow the user to curate the list, such as by manually adding items, deleting items, or changing the relative ranking of items. This allows the system to get a rough understanding of the user's preferences, while allowing the user to provide fine tuning input for them.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:

maintaining, by a social networking system, a plurality of user profiles associated with users of the social networking system, the plurality of user profiles including a user profile associated with a viewing user that includes relative preference information for objects selected by the viewing user;

maintaining, by the social networking system, a plurality of objects and edge objects in a database, the edge objects describing connections between the plurality of user profiles and the plurality of objects in the social networking system;

receiving an action performed by the viewing user, the action corresponding to a first object of the plurality of objects;

storing an edge object in the database between the user profile associated with the viewing user and the first object, the edge object having an edge object type corresponding to the action;

querying the database by the edge object type for the user profile associated with the viewing user, the query returning additional objects to which the action had previously been performed on by the viewing user;

identifying, from the additional objects, a second object based at least in part on the second object sharing one or more properties with the first object;

selecting, by a computer processor of the social networking system, a pair of objects for the user profile associated with the viewing user, the pair of objects including the first object and the second object;

presenting, via the user profile, the pair of objects together with a prompt to select the first object or the second object for display to the viewing user;

receiving a selection of an object from the pair of objects from the viewing user;

storing the selection as a relative preference for the viewing user with one or more additional relative preferences of the viewing user in the social networking system as relative preference information, the relative preference information identifying the viewing user's preference for a user selected object from each presented pair of objects and identifying an unselected object from each presented pair of objects over which the user selected object was selected by the viewing user;

associating the relative preference with the user profile associated with the viewing user;

ranking, by the computer processor, one or more objects including the pair of objects for presentation to an additional user connected to the viewing user via the social networking system based at least in part on the relative preference information;

selecting the user selected object instead of the unselected object from the pair of objects for presentation to the additional user based at least in part on the ranking and the relative preference information; and presenting the user selected object from the pair of objects to the additional user via the social networking system.

2. The computer-implemented method of claim 1, further comprising:

selecting content for presentation to the viewing user based at least in part on the relative preference information; and presenting the selected content to the viewing user.

3. The computer-implemented method of claim 2, wherein selecting content for presentation to the viewing user based at least in part on the relative preference information comprises:

selecting an advertisement associated with the selected object from the pair of objects.

4. The computer-implemented method of claim 2, wherein selecting content for presentation to the viewing user based at least in part on the relative preference information comprises:

selecting an advertisement from a plurality of advertisements based on bid amounts associated with each of the advertisements, objects associated with each of the advertisements and the relative preference information for the viewing user.

5. The computer-implemented method of claim 2, wherein selecting content for presentation to the viewing user based at least in part on the relative preference information comprises:

modifying one or more affinities of the viewing user for one or more objects based at least in part on the relative preference information;

ranking the one or more objects using the modified one or more affinities; and selecting content based at least in part on the ranking.

6. The computer-implemented method of claim 1, wherein storing relative preference information for the viewing user in the social networking system comprises:

generating an object associated with the pair of objects;

storing the object associated with the pair of objects in the social networking system;

storing a connection between the user profile of the viewing user and the object associated with the pair of objects, the connection identifying the selected object.

7. The computer-implemented method of claim 1, wherein selecting the pair of objects for the user profile associated with the viewing user comprises:

selecting the pair from one or more specified pairings of objects.

8. The computer-implemented method of claim 1, wherein selecting the pair of objects for the user profile associated with the viewing user comprises:

receiving, by the social networking system, an action performed by the viewing user;

selecting the pair of objects based at least in part on the action performed by the viewing user.

9. The computer-implemented method of claim 8, wherein the action comprises a check-in at a location.

10. The computer-implemented method of claim 1, wherein the pair of objects is selected at least in part based on the location.

11. The computer-implemented method of claim 1, wherein information in an accessed user profile associated with a user connected to the viewing user comprises an action of the user associated with one or more of the objects in the pair of objects.

12. The computer-implemented method of claim 1, wherein the information in the accessed user profiles comprises one or more interests.

13. A computer-implemented method comprising:

maintaining, by a social networking system, a user profile associated with a user of a social networking system including relative preference information for objects selected by the user;

maintaining, by the social networking system, a plurality of objects and edge objects in a database, the edge objects describing connections between the user profile and the plurality of objects in the social networking system;

receiving an action performed by the user, the action corresponding to a first object of the plurality of objects;

storing an edge object in the database between the user profile associated with the user and the first object, the edge object having an edge object type corresponding to the action;

querying the database by the edge object type for the user profile associated with the user, the query returning additional objects to which the action had previously been performed on by the user;

identifying, from the additional objects, a second object based at least in part on the second object sharing one or more properties with the first object;

receiving, by the social networking system, an action performed by the user;

selecting, by a computer processor, a group of objects including at least two of objects based at least in part on the action performed by the user, the group of objects including the first object and the second object;

presenting, via the user profile, the group of objects to the user with a prompt to select the first object or the second object;
receiving a selection of an object from the group of objects from the user;
storing the selection as a relative preference for the user with one or more additional relative preferences of the viewing user in the social networking system as relative preference information, the relative preference information identifying the user's preference for a user selected object from each presented group of objects and identifying at least one unselected object in each presented group of objects over which the user selected object was selected by the viewing user;
associating the relative preference with the user profile associated with the user;
ranking, by the computer processor, one or more objects including the group of objects for presentation to an additional user connected to the user via the social networking system based at least in part on the relative preference information;
selecting the user selected object from the group of objects instead of the unselected object from the group of objects for presentation to the additional user based at least in part on the ranking and on the relative preference information; and
presenting the user selected object instead of the other objects from the group of objects to the additional user via the social networking system.

14. The computer-implemented method of claim 13, further comprising:
selecting content for presentation to the user based at least in part on the relative preference information; and
presenting the selected content to the user.

15. The computer-implemented method of claim 14, wherein selecting content for presentation to the user comprises:
selecting an advertisement associated with the selected object from the group of objects.

16. The computer-implemented method of claim 14, wherein selecting content for presentation to the user comprises:
selecting an advertisement from a plurality of advertisements based on bid amounts associated with each of the advertisements, objects associated with each of the advertisements and the relative preference information for the user.

17. A computer-implemented method comprising:
maintaining, by a social networking system, a user profile associated with a viewing user of a social networking system including relative preference information for objects selected by the viewing user;
maintaining, by the social networking system, a plurality of objects and edge objects in a database, the edge objects describing connections between the plurality of user profiles and the plurality of objects in the social networking system;
receiving an action performed by the viewing user, the action corresponding to a first object of the plurality of objects;
storing an edge object in the database between the user profile associated with the viewing user and the first object, the edge object having an edge object type corresponding to the action;
querying the database by the edge object type for the user profile associated with the viewing user, the query returning additional objects to which the action had previously been performed on by the viewing user;
identifying, from the additional objects, a second object based at least in part on the second object sharing one or more properties with the first object;
generating, by a computer processor of the social networking system, a plurality of pairs of objects from a set of the stored objects for the user profile, the plurality of pairs of objects including the first object and the second object;
presenting, via the user profile, multiple pairs of objects selected form the plurality of pairs of objects to the viewing user with a prompt to select the first object or the second object;
receiving a selection of an object from each presented pair of objects from the viewing user;
storing the selection as a relative preference for the viewing user with one or more additional relative preferences of the viewing user in the social networking system as relative preference information, the relative preference information identifying, for each pair of objects, the viewing user's preference for the user object selected from the pair of objects by the viewing user and identifying an unselected object in the pair of objects over which the user selected object was selected by the viewing user;
ranking, by the computer processor, objects in the set of stored objects, which includes objects from each of the plurality of pairs of objects, based at least in part on the stored relative preference information for the preference of the viewing user for objects selected from each pair of objects; and
presenting additional content to a user of the social networking system connected to the user via the social networking system based on the ranking, the additional content associated with an object from the pair of objects selected over the unselected object included in the pair of objects.

18. The computer-implemented method of claim 17, wherein presenting additional content to the user of the social networking system based on the ranking comprises:
presenting an advertisement associated with an object from the set of objects to a user connected to the viewing user, the advertisement including information about the ranking.

19. The computer-implemented method of claim 17, wherein presenting additional content to the user of the social networking system based on the ranking comprises:
selecting information about an object in the set for a user connected to the viewing user based at least in part on the object's position in the ranking; and
presenting the selected information to the user connected to the viewing user.

* * * * *

UNITED STATES PATENT AND TRADEMARK OFFICE
CERTIFICATE OF CORRECTION

| | |
|---|---|
| PATENT NO. | : 10,884,589 B2 |
| APPLICATION NO. | : 13/602685 |
| DATED | : January 5, 2021 |
| INVENTOR(S) | : Mark Pike et al. |

It is certified that error appears in the above-identified patent and that said Letters Patent is hereby corrected as shown below:

In the Claims

Column 14, Line 65, Claim 13, delete "a group of objects including at least two of objects based at least" and insert -- a group of objects including at least two pairs of objects based at least --.

Signed and Sealed this
Seventeenth Day of August, 2021

Drew Hirshfeld
*Performing the Functions and Duties of the
Under Secretary of Commerce for Intellectual Property and
Director of the United States Patent and Trademark Office*